US008339977B2

(12) United States Patent
Wild

(10) Patent No.: US 8,339,977 B2
(45) Date of Patent: Dec. 25, 2012

(54) METHOD AND APPARATUS FOR ALLOCATION OF PARAMETERS FOR RADIO TRANSMISSION IN WIRELESS COMMUNICATION NETWORK

(75) Inventor: Thorsten Wild, Stuttgart (DE)

(73) Assignee: Alcatel Lucent, Paris (FR)

( * ) Notice: Subject to any disclaimer, the term of this patent is extended or adjusted under 35 U.S.C. 154(b) by 706 days.

(21) Appl. No.: 12/491,053

(22) Filed: Jun. 24, 2009

(65) Prior Publication Data
US 2009/0323618 A1 Dec. 31, 2009

(30) Foreign Application Priority Data

Jun. 24, 2008 (EP) .................................. 08305316

(51) Int. Cl.
*H04W 4/00* (2009.01)
(52) U.S. Cl. ........ 370/252; 370/329; 370/341; 375/146; 375/147
(58) Field of Classification Search ........................ None
See application file for complete search history.

(56) References Cited

U.S. PATENT DOCUMENTS

| 7,664,061 B2 * | 2/2010 | Hottinen ........................ 370/310 |
| 2004/0013174 A1 * | 1/2004 | Nuutinen et al. ............. 375/148 |
| 2005/0276361 A1 * | 12/2005 | Kim et al. ...................... 375/347 |
| 2007/0297529 A1 | 12/2007 | Zhou et al. |
| 2009/0131123 A1 * | 5/2009 | Coersmeier et al. .......... 455/574 |
| 2010/0046402 A1 * | 2/2010 | Forck et al. ................... 370/280 |

OTHER PUBLICATIONS

Nosratinia A. et al., "Antenna Selection in MIMO Systems,", IEEE Communications Magazine, IEEE Service Center, Piscataway, US, vol. 42, No. 10, XP011120044, pp. 68-73, (Oct. 1, 2004).
Kaibin Huang et al., "Multi-User Aware Limited Feedback for MIMO Systems," IEEE Transactions on Signal Processing (online), XP002526659, pp. 1-29, (Jan. 22, 2007).
European Search Report.

* cited by examiner

*Primary Examiner* — Chi H. Pham
*Assistant Examiner* — Shick Hom
(74) *Attorney, Agent, or Firm* — Fay Sharpe LLP

(57) ABSTRACT

A method for allocation of parameters for radio transmission in a wireless communication network using channel feedback compression is provided. At least one channel impulse response in the time domain for at least one connection (CH13-CH24) between an antenna (A1, A2) of a transmitter (BS) and an antenna of a receiver (MS) is determined. Only the at least one complex coefficient related to one or more time intervals of the at least one channel impulse response with a power higher than a predefined threshold is fed back. Parameters for radio transmission are allocated to the at least one connection (CH13-CH24) based on the at least one channel impulse response which is fed back. Network elements and a wireless communication network associated with the method are also provided.

26 Claims, 2 Drawing Sheets

Channel impulse response amplitudes for each antenna to antenna link

Power delay profile averaged over time and antennas

RAKE fingers

METHOD AND APPARATUS FOR ALLOCATION OF PARAMETERS FOR RADIO TRANSMISSION IN WIRELESS COMMUNICATION NETWORK

BACKGROUND OF THE INVENTION

The invention is based on a priority application EP 08305316.5 which is hereby incorporated by reference.

The invention relates to a method for allocation of parameters for radio transmission in a wireless communication network using channel feedback compression, wherein at least one channel impulse response in the time domain for at least one connection (CH13-CH24) between an antenna (A1, A2) of a transmitter (BS) and an antenna of a receiver (MS) is determined, only the at least one complex coefficient related to one or more time intervals of said at least one channel impulse response with a power higher than a predefined threshold is fed back, and parameters for radio transmission are allocated to said at least one connection (CH13-CH24) based on the at least one channel impulse response which is fed back.

A network element (MS) adapted to perform channel feedback compression for allocation of parameters for radio transmission in a wireless communication network, wherein the network element (MS) comprises at least one processing means adapted to determine the at least one channel impulse response in the time domain for at least one connection (CH13-CH24) between an antenna (A1, A2) of a further network element (BS) and an antenna (A3, A4) of said network element (MS), compare the power of said at least one channel impulse response with a predefined threshold, and transmit only the at least one complex coefficient related to one or more time intervals of said at least one channel impulse response with a power higher than said predefined threshold.

A network element (BS) adapted to perform allocation of parameters for radio transmission in a wireless communication network with channel feedback compression, wherein the network element (BS) comprises at least one processing means adapted to receive at least one complex coefficient related to one or more time intervals of at least one channel impulse response with a power higher than a predefined threshold for at least one connection (CH13-CH24) between an antenna (A3, A4) of said network element (BS) and an antenna (A1, A2) of a further network element (MS), and allocate parameters for radio transmission to said at least one connection (CH13-CH24) based on the at least one channel impulse response with a power higher than a predefined threshold.

A wireless communication network with at least one network element (MS) for determination of said one or more time intervals, said at least one channel impulse response is averaged over time or antenna links.

and at least one network element (BS) for allocation of parameters for radio transmission in a wireless communication network using channel feedback compression, wherein at least one channel impulse response in the time domain for at least one connection (CH13-CH24) between an antenna (A1, A2) of a transmitter (BS) and an antenna of a receiver (MS) is determined, only the at least one complex coefficient related to one or more time intervals of said at least one channel impulse response with a power higher than a predefined threshold is fed back, and parameters for radio transmission are allocated to said at least one connection (CH13-CH24) based on the at least one channel impulse response which is fed back.

In wireless communication systems like e.g. Third Generation Partnership Project Long Term Evolution (3GPP LTE) or Worldwide Interoperability for Microwave Access (WIMAX), the usage of antenna diversity that is applied e.g. in multiple-input multiple-output (MIMO) technology offers a high data rate achieved e.g. by means of a high spectral efficiency and diversity.

Orthogonal frequency division multiplexing (OFDM) can be used e.g. in broadband MIMO systems to divide frequency selective channels into a set of narrowband flat-fading subchannels. Such flat-fading subchannels can be used e.g. in a network that applies interference coordination in order to achieve a high data rate.

For the optimization of a MIMO-OFDM system, information about amplitude and phase of the different channels are needed at the transmitter side. Such information are typically fed back in form of channel state information (CSI) from a receiver to a transmitter. The channel state information (CSI) is required by nearly all MIMO algorithms at the transmitter side for allocation of parameters for radio transmission, as e.g. for choosing the appropriate antenna weights or modulation and coding schemes.

Due to frequency selectivity and temporal evolution of the channel on the one hand and the increased dimension by needing feedback for each transmitter antenna to receiver antenna link, this CSI feedback becomes very large, wasting uplink capacity for signaling load.

An approach according to the state of the art is to feed back for each pilot symbol a certain amount of bits, e.g. 16 bits, to obtain the complex coefficient of the channel transfer function for each channel. Thus, the amount of required feedback for this approach is extremely large.

Another standard approach is to transfer the channel into the time domain and feed back the channel impulse response (CIR). Again this gives a quite large overhead required for feedback.

According to other prior art solutions, temporal or frequency resolution or the granularity of the complex coefficients of the channel transfer function that are fed back is reduced. However, there will then be a loss in accuracy which may lead to a non-appropriate allocation of parameters for radio transmission.

A method for reducing feedback in a MIMO-OFDM network according to the prior art uses vector quantization compression to limit the size of feedback data required to be sent to a transmitter for optimizing communications between MIMO-OFDM devices. In finite state vector quantization feedback, optimal precoding matrices are selected sequentially across subcarriers. After selecting the first precoding matrix from a codebook of a certain size, subsequent preceding matrices are selected from a smaller time-varying codebook per subcarrier depending on prior decisions. Such a method for feedback reduction is e.g. described in the US patent application US 2007/0297529 A1.

However, this method reduces the feedback by means of reducing the size of the codebook per subcarrier and thus the needed amount of bits for feedback of the optimum precoding matrix instead of reducing the CSI feedback. If the MIMO algorithm that is used at the transmitter side needs CSI information in addition to information about the optimum precoding matrix, the huge amount of CSI feedback must be sent to the transmitter in addition to the information about the optimum precoding matrix.

So for all of the above mentioned approaches for channel feedback, it can be stated that either information is lost or the required feedback bandwidth is too high.

In order to have a high channel quality leading to a high data rate and at the same time enough uplink capacity for data transmission, reduction of the feedback of the channel state with low loss of significant information about the channel state is therefore required.

SUMMARY OF THE INVENTION

The object of the invention is thus to propose a method for allocation of parameters for radio transmission in a wireless communication network based on information related to the channel state that is fed back from a receiver to a transmitter using feedback compression of said information with low loss of significant information.

This object is achieved by a method for allocation of parameters for radio transmission in a wireless communication network using channel feedback compression, wherein at least one channel impulse response in the time domain for at least one connection (CH13-CH24) between an antenna (A1, A2) of a transmitter (BS) and an antenna of a receiver (MS) is determined, only the at least one complex coefficient related to one or more time intervals of said at least one channel impulse response with a power higher than a predefined threshold is fed back, and parameters for radio transmission are allocated to said at least one connection (CH13-CH24) based on the at least one channel impulse response which is fed back.

A network element (MS) adapted to perform channel feedback compression for allocation of parameters for radio transmission in a wireless communication network, wherein the network element (MS) comprises at least one processing means adapted to determine the at least one channel impulse response in the time domain for at least one connection (CH13-CH24) between an antenna (A1, A2) of a further network element (BS) and an antenna (A3, A4) of said network element (MS), compare the power of said at least one channel impulse response with a predefined threshold, and transmit only the at least one complex coefficient related to one or more time intervals of said at least one channel impulse response with a power higher than said predefined threshold.

A network element (BS) adapted to perform allocation of parameters for radio transmission in a wireless communication network with channel feedback compression, wherein the network element (BS) comprises at least one processing means adapted to receive at least one complex coefficient related to one or more time intervals of at least one channel impulse response with a power higher than a predefined threshold for at least one connection (CH13-CH24) between an antenna (A3, A4) of said network element (BS) and an antenna (A1, A2) of a further network element (MS), and allocate parameters for radio transmission to said at least one connection (CH13-CH24) based on the at least one channel impulse response with a power higher than a predefined threshold.

A wireless communication network with at least one network element (MS) for allocation of parameters for radio transmission in a wireless communication network using channel feedback compression, wherein at least one channel impulse response in the time domain for at least one connection (CH13-CH24) between an antenna (A1, A2) of a transmitter (BS) and an antenna of a receiver (MS) is determined, only the at least one complex coefficient related to one or more time intervals of said at least one channel impulse response with a power higher than a predefined threshold is fed back, and parameters for radio transmission are allocated to said at least one connection (CH13-CH24) based on the at least one channel impulse response which is fed back.

For determination of said one or more time intervals, said at least one channel impulse response is averaged over time or antenna links.

At least one network element (BS) of parameters for radio transmission in a wireless communication network using channel feedback compression, wherein at least one channel impulse response in the time domain for at least one connection (CH13-CH24) between an antenna (A1, A2) of a transmitter (BS) and an antenna of a receiver (MS) is determined, only the at least one complex coefficient related to one or more time intervals of said at least one channel impulse response with a power higher than a predefined threshold is fed back, and parameters for radio transmission are allocated to said at least one connection (CH13-CH24) based on the at least one channel impulse response which is fed back.

For determination of said one or more time intervals, said at least one channel impulse response is averaged over time or antenna links.

Said network element (Ms) is a mobile terminal.

The main idea of the invention is to use the principles of a so-called Rake receiver to compress the feedback of information about the channel state. A Rake receiver is a pure receiver technique known e.g. from code division multiple access (CDMA) that is designed to counter the effects of multipath fading. According to the invention, the technical principles of a Rake receiver will be used to compress feedback in a wireless network, which is a methodic guidance in a completely new context.

According to the invention, a channel impulse response in the time domain for a connection between an antenna of a transmitter and an antenna of a receiver is determined, and only complex coefficients of the channel impulse response related to time intervals of said channel impulse response with a power higher than a predefined threshold are fed back. Parameters for radio transmission are allocated to said connection based on the channel impulse response which is fed back.

Further developments of the invention can be gathered from the dependent claims and the following description.

BRIEF DESCRIPTION OF THE DRAWINGS

In the following the invention will be explained further making reference to the attached drawings.

A wireless communication network in which the invention can be implemented comprises various network elements like mobile terminals or base stations.

Figure 1:
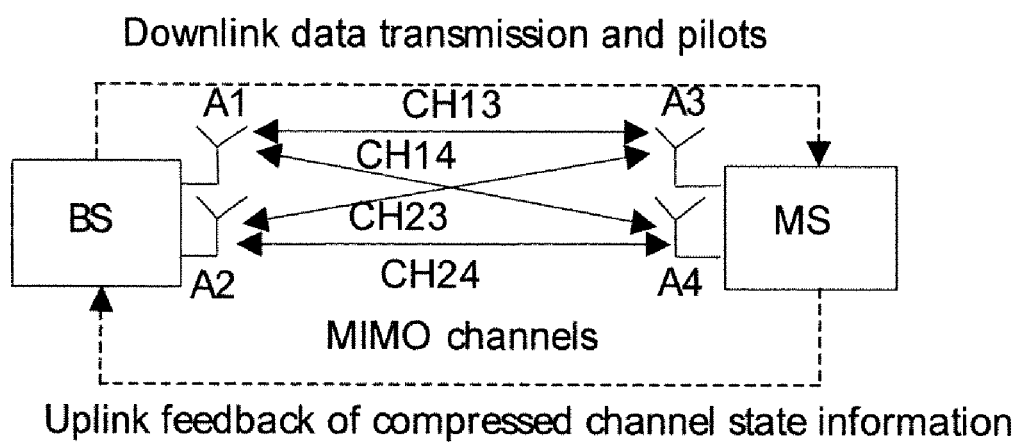
FIG. 1 schematically shows a multi-antenna base station and a multi-antenna mobile terminal as part of a wireless communication network in which uplink feedback of compressed channel state information according to the invention can be implemented.

FIG. 1 shows as an example a base station BS and a mobile terminal MS as part of a wireless communication network.

The base station BS comprises exemplarily two antennas A1 and A2 that are adapted to transmit and receive radio signals.

The base station BS comprises the functionality of a base station of a network using radio transmission, i.e. the base station provides the possibility for mobile terminals to get connected to said network and for data exchange of said mobile terminals by means of radio transmission.

Furthermore, the base station BS according to the invention comprises at least one processing means adapted to receive at least one complex coefficient related to one or more time intervals of at least one channel impulse response with a power higher than a predefined threshold for at least one connection between an antenna of said base station and an antenna of a further network element, and allocate resources to said at least one connection based on the at least one channel impulse response that has a power higher than a predefined threshold.

The mobile terminal MS comprises exemplarily two antennas A3 and A4 that are adapted to transmit and receive radio signals.

The mobile terminal MS comprises the functionality of a mobile terminal for transmission and reception of signals in a network using radio transmission.

Furthermore, the mobile terminal MS according to the invention comprises at least one processing means adapted to determine the at least one channel impulse response in the time domain for at least one connection between an antenna of a further network element and an antenna of the mobile terminal MS, compare the power of said at least one channel impulse response with a predefined threshold, and transmit only the at least one complex coefficient related to one or more time intervals of said at least one channel impulse response with a power higher than said predefined threshold.

Each of the antennas A3 and A4 of the mobile terminal MS is connected to each of the base station BS by means of a MIMO channel CH13-CH24, which is symbolized by double arrows in FIG. 1. The base station BS is in turn connected to a core network, which is not shown in FIG. 1 for the sake of simplicity.

The base station BS sends data and pilots in downlink over each of said MIMO channels CH13-CH24. The principle downlink transmission is indicated by a dashed arrow from the base station BS to the mobile terminal MS in FIG. 1. The mobile terminal MS receives said data and pilots and performs channel estimation preferably using said pilots, which results in a so-called channel transfer function (CTF) per antenna-to-antenna link, i.e. for each MIMO channel CH13-CH24, and per subcarrier.

By means of an inverse fast Fourier transformation (IFFT) performed in the mobile terminal MS, said channel transfer function (CTF) can be transferred from the frequency domain into the time domain resulting in a channel impulse response (CIR) for each antenna-to-antenna-link.

Figure 2:
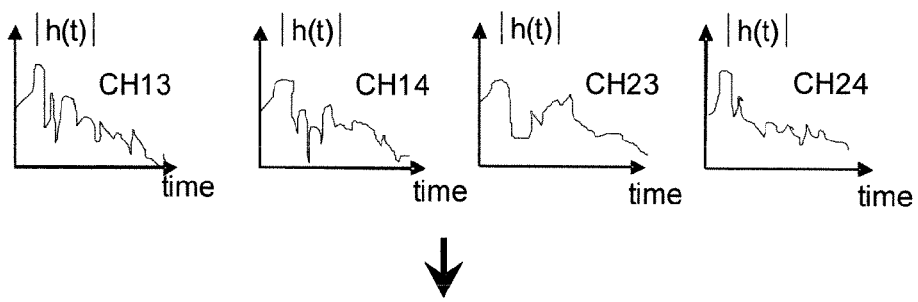
FIG. 2 schematically shows the derivation of so-called long-term Rake fingers and associated complex coefficients from instantaneous channel impulse responses for several channels.
Figure 2:
Figure 2:
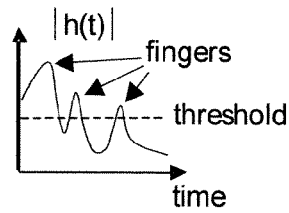
Figure 2:
Figure 2:
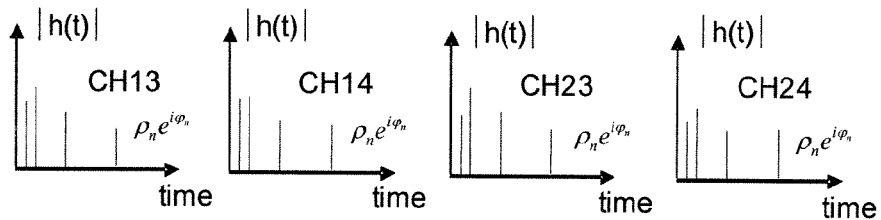

In the first row of FIG. 2, the amplitudes of the channel impulse response over the time are depicted for each antenna-to-antenna link, i.e. for each MIMO channel CH13-CH24. The channel impulse response for a certain MIMO channel from transmit antenna l to receive antenna m can be expressed by the channel impulse response function $h_{l,m}(t)$ according to the following formula:

$$h_{l,m}(t) = \sum_{n=0}^{N-1} \rho_{l,m,n} e^{i\varphi_{l,m,n}} \delta(t - \tau_n)$$

In the formula above, N is the number of impulses, $\tau_n$ is the time delay of the impulse denoted with the number n, and $\rho_{l,m,n} e^{i\varphi_{l,m,n}}$ represents the complex coefficient of impulse number n that is defined by the amplitude $\rho_{l,m,n}$ and the phase $\varphi_{l,m,n}$.

A path profiling procedure performed in the mobile terminal MS similar to the procedure performed in Rake receivers is used to identify the most significant taps of the channel impulse response i.e. the taps which have the strongest power. Said taps are called fingers in the Rake receiver architecture.

In an embodiment of the invention, the amplitudes of the channel impulse response of each single antenna-to-antenna link are time-averaged, and the taps which have the strongest power are identified as fingers.

Path profiling according to the embodiment depicted in FIG. 2 is realized by averaging the absolute values, i.e. the amplitudes, of the channel impulse response both over time and over all antenna-to-antenna links using a low pass filter, e.g. a first order infinitive impulse response filter.

Preferably said low pass filter is applied with a certain forgetting factor that weights importance of past and present data in the filtering process.

In an embodiment of the invention, when only one realization of the channel is needed for one instant, the low pass filtering is skipped.

Said averaging over time or antenna-to-antenna-links results in a channel impulse response that is free from fast fading components and is called power delay profile. Such a power delay profile, i.e. channel impulse response, that is averaged over time and antennas is shown in FIG. 2.

In said power delay profile, the strongest taps can be assigned to fingers. All taps below a certain threshold, which is e.g. defined by a combination of noise level, interference level and a certain margin, or by the sensitivity level of the receiver in the mobile terminal MS, are deleted in order to avoid wasting feedback resources for noisy fingers. In FIG. 2, the threshold is indicated by a dashed line.

Preferably, in the finger assignment, a certain minimum distance between selected fingers is kept which is in the range of the OFDM sampling rate.

In an embodiment of the invention, the number of fingers that is allowed is a parameter to fine-tune the tradeoff between feedback reduction and complexity.

For the time intervals in which the amplitude of the channel impulse response that has been averaged over time and antennas is higher than said certain threshold, i.e. for the fingers, the complex coefficients of the channel impulse response are determined for each antenna-to-antenna-link. Preferably, the channel impulse response is time-averaged for each antenna-to-antenna-link before determination of said complex coefficients in said time intervals. In other words, the complex coefficients are taken at the delays $\tau$ of the assigned fingers from instantaneous channel impulse responses for each antenna-to-antenna-link.

Right at the bottom of FIG. 2, the amplitudes of the complex coefficients $\rho_n e^{i\Phi_n}$ of said fingers, i.e. of the channel impulse response in said time intervals, are depicted for each antenna-to-antenna link CH13-CH24 over the time.

Said complex coefficients $\rho_n e^{i\Phi_n}$ of the fingers and their position in time, i.e. the delays $\tau$ of the fingers, are fed back from the mobile terminal MS to the base station BS preferably in a fast fading granularity, e.g. the complex coefficients $\rho_n e^{i\Phi_n}$ are updated every millisecond or faster. The interval of updates of the complex coefficients $\rho_n e^{i\Phi_n}$ is preferably matched to the coherence time of the respective channel. The determination of the coherence time is e.g. based on an estimation of the velocity of the mobile terminal MS, which is in turn used for determination of the Doppler frequency.

Thus, a feedback compression effect comes from reducing the channel impulse response to a channel impulse response of the fingers, in which only the most significant multipath propagation components are contained.

In a preferred embodiment, the finger delays, i.e. the position in time of the fingers, and their power or amplitude of the channel impulse response that is averaged over time or antenna links are fed back from the mobile terminal MS to the base station BS on a long-term basis e.g. in the order of seconds or hundreds of milliseconds, as said parameters are only slowly fading. Alternatively, the finger delays are fed back whenever a significant change in the power delay profile occurs.

In another preferred embodiment, the complex coefficients $\rho_n e^{i\Phi_n}$ of said fingers, i.e. of the channel impulse response in said time intervals of each antenna-to-antenna link, are composed of time-average values of the real amplitudes, i.e. the time-averaged power of said fingers, and variable complex parts of the complex coefficients $\rho_n e^{i\Phi_n}$ of said fingers, which are faster fading than the time-averaged power of said fingers. Information about said time-average values of the real amplitudes is fed back from the mobile terminal MS to the base station BS less frequent than the variable complex parts of the complex coefficients $\rho_n e^{i\Phi_n}$ of said fingers.

Thus, a further feedback compression effect makes use of the fact, that delays of said fingers and their average power are changing slowly, i.e. on a slowly fading timescale, and information about said delays of said fingers and their average power are reported less frequent less frequent than the variable complex parts of the complex coefficients $\rho_n e^{i\Phi_n}$ of said fingers.

Preferably, the number of bits used for feedback of the variable complex parts of the complex coefficients $\rho_n e^{i\Phi_n}$ of said fingers is reduced due to the fact that a part of the complex amplitude information is already contained in the average power of the fingers which is available on a long-term basis. In other words, the amount of bits used for feedback of the variable complex parts of the complex coefficients $\rho_n e^{i\Phi_n}$ of said fingers is restricted to the amount of bits needed for indication of the maximum deviation of the time-average values of the real amplitudes from the complex coefficients $\rho_n e^{i\Phi_n}$ of said fingers in said time intervals.

Thus, another feedback compression effect is based on the fact, that the indication of the remaining fast fading variable complex parts of the complex coefficients $\rho_n e^{i\Phi_n}$ of said fingers is reduced in number of bits because the average dynamic range is already contained in the average power of said fingers.

The information about the channel impulse response which is fed back from the mobile terminal MS to the base station BS is used by the base station BS to allocate parameters for radio transmission, as e.g. antenna weights, modulation and coding schemes or transmission power, to connections between antennas A1, A2 of the base station BS and antennas A3, A4 of the mobile terminal.

The invention is parameterizable in terms of number of fingers and number of bits used for feedback of the average power of the fingers and for the complex coefficients $\rho_n e^{i\Phi_n}$ of said fingers.

Feedback compression as described above saves the valuable feedback bandwidth to allow data transmission in uplink instead of feedback of channel impulse response. As the invention is scalable and parameterizable, it allows to find the best tradeoff of performance and feedback quantity for each transmission scenario.

A complete feedback of channel state information according to the state of the art with e.g. 16 bit resolution for current 5 MHz LTE with feedback of 200000 pilots per second requires a feedback bandwidth of 3.2 Mbit/s.

A Rake-based feedback according to the invention using 10 fingers requires a feedback bandwidth of 0.32 Mbit/s for the complex coefficients plus a few long-term bits in the range of e.g. 100 bits for transmission of finger delays and average power of said fingers.

Thus for this example the Rake-compression would achieve nearly a factor of 10 over state of the art feedback.

The amount of required fingers and their corresponding resolution in number of bits depends on the propagation scenario and thus has to be investigated.

The invention has been described for a MIMO-OFDM system, however, the application of the invention is not restricted to such a system, as it is e.g. also applicable in a system with only one antenna-to-antenna link between the base station BS and the mobile terminal MS which does not apply frequency division as principle.

The invention has been described for the case of channel impulse response feedback from a mobile terminal MS to a base station BS. However, the invention is applicable for allocation of parameters for radio transmissions between any kind of network elements, e.g. between two base stations.

The invention claimed is:

1. A method for allocation of parameters for radio transmission in a wireless communication network using channel feedback, comprising:
   determining a channel impulse response over a select time for an antenna link between transmitting network element and a receiving network element at the receiving network element based at least in part on transmissions over the antenna link from the transmitting network element received by the receiving network element;
   forming a power delay profile representative of the transmissions from the transmitting network element in conjunction with the select time based at least in part on the channel impulse response;
   assigning fingers in the power delay profile at delay times with a power higher than a predefined threshold in relation to the select time and associating each finger with its corresponding delay time;
   determining a complex coefficient for each finger in relation to the channel impulse response for the antenna link over the select time to form a compressed impulse response for the antenna link; and
   feeding back the complex coefficient and corresponding delay time for each finger in the compressed impulse response for the antenna link from the receiving network element to the transmitting network element.

2. The method according to claim 1, wherein the complex coefficient for each finger includes a time-average amplitude value for a real part and an instantaneous phase value for a complex part, wherein the time-average amplitude value is based at least in part on an average of instantaneous amplitude values for the power delay profile over the select time, wherein the time-average amplitude value of the real part is fed back less frequent than the instantaneous phase value for the complex part.

3. The method according to claim 1, wherein said channel impulse response is filtered by a low pass filter in conjunction with forming the power delay profile.

4. The method according to claim 1, the assigning element further comprising:
   assigning fingers at delay times such that time between adjacent fingers in the power delay profile over the select time is not less than a predefined minimum time.

5. The method according to claim 1, the assigning element further comprising:
   assigning fingers at delay times such that time between adjacent fingers in the power delay profile over the select time relates to a coherence time for the antenna link between the transmitting and receiving network elements.

6. The method according to claim 1, the assigning element further comprising:
assigning fingers at delay times in the power delay profile over the select time after a predefined change in the power delay profile.

7. The method according to claim 1, the assigning element further comprising:
identifying taps in the power delay profile over the select time based on a select interval between taps;
assigning fingers to taps for which the power is higher than the predefined threshold; and
associating each finger with its corresponding delay time in relation to the select time and the select interval.

8. The method according to claim 1 wherein the complex coefficient for each finger includes an instantaneous amplitude value for a real part and an instantaneous phase value for a complex part.

9. The method according to claim 1, further comprising:
determining an average power for the fingers in relation to the channel impulse response; and
feeding back the average power for fingers in the channel impulse response for the antenna link from the receiving network element to the transmitting network element.

10. The method according to claim 9 wherein the complex coefficient for each finger includes an instantaneous amplitude value representing a deviation from the average power for a real part and an instantaneous phase value for a complex part.

11. The method according to claim 1 wherein the first determining element includes determining a channel impulse response over the select time for each of a plurality of antenna links between the transmitting network element and the receiving network element at the receiving network element based at least in part on transmissions over the plurality of antenna links from the transmitting network element received by the receiving network element, the method further comprising:
averaging the channel impulse responses for the plurality of antenna links to form the power delay profile, wherein the power delay profile is representative of transmissions from the transmitting network element to the receiving network element over the plurality of antenna links in conjunction with the select time;
wherein the second determining element includes determining complex coefficients for each finger in relation to each channel impulse response for the plurality of antenna links over the select time to form compressed impulse responses for each antenna link;
wherein the feeding back element includes feeding back the complex coefficient and the corresponding delay time for each finger in each compressed impulse response for the plurality of antenna links from the receiving network element to the transmitting network element.

12. The method according to claim 11 wherein each channel impulse response is averaged over time in conjunction with forming the power delay profile.

13. A receiving network element to facilitate allocation of parameters for radio transmission in a wireless communication network using channel feedback, the receiving network element comprising:
a signal processor configured to determine a channel impulse response over a select time for an antenna link between a further network element and the receiving network element based at least in part on transmissions over the antenna link from the further network element received by the receiving network element;
a profile processor configured to form a power delay profile representative of the transmissions from the further network element in conjunction with the select time based at least in part on the channel impulse response;
a finger processor configured to assign fingers in the power delay profile at delay times with a power higher than said predefined threshold in relation to the select time and to associate each finger with its corresponding delay time;
compression processor configured to determine a complex coefficient for each finger in relation to the channel impulse response for the antenna link over the select time to form a compressed impulse response for the antenna link; and
a transmitter configured to feed back the complex coefficient and corresponding delay time for each finger in the compressed impulse response for the antenna link from the receiving network element to the further network element.

14. The receiving network element according to claim 13 wherein said receiving network element is a mobile terminal.

15. The receiving network element according to claim 13 wherein the receiving network element is a base station.

16. The receiving network element according to claim 13 wherein the finger processor is configured to assign fingers at delay times such that time between adjacent fingers in the power delay profile over the select time is not less than a predefined minimum time.

17. The receiving network element according to claim 13 wherein the finger processor is configured to assign fingers at delay times such that time between adjacent fingers in the power delay profile over the select time relates to a coherence time for the antenna link between the transmitting and receiving network elements.

18. The receiving network element according to claim 13 wherein the finger processor is configured to assign fingers at delay times in the power delay profile over the select time after a predefined change in the power delay profile.

19. The receiving network element according to claim 13 wherein the finger processor is configured to identify taps in the power delay profile over the select time based on a select interval between taps, assign fingers to taps for which the power is higher than the predefined threshold, and associate each finger with its corresponding delay time in relation to the select time and the select interval.

20. The receiving network element according to claim 13 wherein the compression processor is configured to determine an average power for the fingers in relation to the channel impulse response;
wherein the transmitter is configured to feed back the average power for fingers in the channel impulse response for the antenna link from the receiving network element to the transmitting network element.

21. The receiving network element according to claim 13 wherein the signal processor is configured to determine a channel impulse response over the select time for each of a plurality of antenna links between the transmitting network element and the receiving network element at the receiving network element based at least in part on transmissions over the plurality of antenna links from the transmitting network element received by the receiving network element;
wherein the profile processor is configured to average the channel impulse responses for the plurality of antenna links to form the power delay profile, wherein the power delay profile is representative of transmissions from the transmitting network element to the receiving network element over the plurality of antenna links in conjunction with the select time;

wherein the compression processor is configured to determine complex coefficients for each finger in relation to each channel impulse response for the plurality of antenna links over the select time to form compressed impulse responses for each antenna link;

wherein the transmitter is configured to feed back the complex coefficient and the corresponding delay time for each finger in each compressed impulse response for the plurality of antenna links from the receiving network element to the transmitting network element.

22. A transmitting network element to facilitate allocation of parameters for radio transmission in a wireless communication network using channel feedback, the transmitting network element comprising:

a receiver configured to receive channel feedback from further network element relating to an antenna link between the transmitting network element and the further network element, wherein the channel feedback is based at a art on the further network element receiving prior transmissions over the antenna link, determining a channel impulse response over a select time for the antenna link based at least in part on the prior transmissions, forming a power delay profile representative of the prior transmissions from the transmitting network element in conjunction with the select time based at least in part on the channel impulse response, assigning fingers in the power delay profile at delay times with a power higher than a predefined threshold in relation to the select time, associating each finger with its corresponding delay time, and determining a complex coefficient for each finger in relation to the channel impulse response for the antenna link over the select time to form a compressed impulse response for the antenna link; and a signal processor configured to allocate parameters for other transmissions from the transmitting network element to the further network element over the antenna link based at least in part on the channel feedback.

23. The transmitting network element according to claim 22 wherein said transmitting network element is a base station.

24. The transmitting network element according to claim 22 wherein the receiver is configured to receive channel feedback from the further network element relating to each of a plurality of antenna links between the transmitting network element and the further network element, wherein the channel feedback is based at least in part on the further network element receiving prior transmissions over the plurality of antenna links, determining a channel impulse response over the select time for each of the plurality of antenna links based at least in part on the prior transmissions, averaging the channel impulse responses for the plurality of antenna links to form the power delay profile, and determining complex coefficients for each finger in relation to each channel impulse response for the plurality of antenna links over the select time to form compressed impulse responses for each antenna link;

wherein the signal processor is configured to allocate parameters for other transmissions from the transmitting network element to the further network element over the plurality of antenna links based at least in part on the channel feedback.

25. A method for allocation of parameters for radio transmission in a wireless communication network using channel feedback, comprising:

receiving channel feedback from a further network element at a transmitting network element, the channel feedback relating to an antenna link between the transmitting network element and the further network element, wherein the channel feedback is based at least in part on the further network element receiving prior transmissions over the antenna link, determining a channel impulse response over a select time for the antenna link based at least in part on the prior transmissions, forming a power delay profile representative of the prior transmissions from the transmitting network element in conjunction with the select time based at least in part on the channel impulse response, assigning fingers in the power delay profile at delay times with a power higher than a predefined threshold in relation to the select time, associating each finger with its corresponding delay time, and determining a complex coefficient for each finger in relation to the channel impulse response for the antenna link over the select time to form a compressed impulse response for the antenna link; and allocating parameters for other transmissions from the transmitting network element to the further network element over the antenna link based at least in part on the channel feedback.

26. The method according to claim 25 wherein the channel feedback relates to each of a plurality of antenna links and based at least in part on the further network element receiving prior transmissions over the plurality of antenna links, determining a channel impulse response over the select time for each of the plurality of antenna links based at least in part on the prior transmissions, averaging the channel impulse responses for the plurality of antenna links to form the power delay profile, and determining complex coefficients for each finger in relation to each channel impulse response for the plurality of antenna links over the select time to form compressed impulse responses for each antenna link;

wherein the allocating element includes allocating parameters for other transmissions from the transmitting network element to the further network element over the plurality of antenna links based at least in part on the channel feedback.

* * * * *